United States Patent
Matsumoto et al.

(10) Patent No.: US 6,618,664 B2
(45) Date of Patent: Sep. 9, 2003

(54) AUTOMATIC VEHICULAR VELOCITY CONTROLLING SYSTEM AND METHOD FOR AUTOMOTIVE VEHICLE

(75) Inventors: Shinji Matsumoto, Yokohama (JP); Takeshi Kimura, Kanagawa (JP); Taku Takahama, Kanagawa (JP); Hiromitsu Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/891,122

(22) Filed: Jun. 26, 2001

(65) Prior Publication Data

US 2003/0038714 A1 Feb. 27, 2003

(30) Foreign Application Priority Data

Jul. 4, 2000 (JP) ........................................ 2000-202639

(51) Int. Cl.[7] ............................................. B60R 21/00
(52) U.S. Cl. ........................... 701/96; 701/80; 340/903; 340/435; 180/170
(58) Field of Search .............................. 701/96, 93, 94, 701/72, 80, 300, 301; 340/903, 435, 436; 180/169, 170

(56) References Cited

U.S. PATENT DOCUMENTS

| 5,420,792 | A | * | 5/1995 | Butsuen et al. ............... 701/96 |
| 5,529,139 | A | * | 6/1996 | Kurahashi et al. ........... 180/169 |
| 5,699,040 | A | * | 12/1997 | Matsuda ...................... 340/435 |
| 6,154,168 | A | * | 11/2000 | Egawa et al. ................. 342/71 |
| 6,285,944 | B1 | * | 9/2001 | Tange et al. .................. 701/96 |
| 6,397,140 | B2 | * | 5/2002 | Minowa et al. ............... 701/96 |
| 6,429,788 | B2 | | 8/2002 | Matsumoto et al. ......... 340/901 |

FOREIGN PATENT DOCUMENTS

| JP | 9-286257 | 11/1997 |
| JP | 10-119673 | 5/1998 |
| JP | 11-34696 | 2/1999 |
| JP | 11-334555 | 12/1999 |

OTHER PUBLICATIONS

"Development of Adaptive Cruise Control with Brake Actuation", by Iijima et al., Journal of Society of Automotive Engineers of Japan, vol. 53 (1999), pp. 98–103. (Month is not available).

* cited by examiner

Primary Examiner—Tan Q. Nguyen
(74) Attorney, Agent, or Firm—Foley & Lardner

(57) ABSTRACT

In a vehicular velocity controlling system and method, a vehicular velocity control is performed in such a manner that an inter-vehicle distance of a host vehicle to a preceding vehicle is substantially made equal to a target inter-vehicle distance during a presence of the preceding vehicle and in such a manner that the vehicular velocity is substantially made equal to a set vehicular velocity during an absence of the preceding vehicle, a frictional coefficient of a road surface on which the host vehicle is running or about to run is detected, an upper limit value for the vehicular velocity control is set in accordance with the detected road surface frictional coefficient, below the upper limit value of which the vehicular velocity control is enabled to be performed in such a manner that as the road surface frictional coefficient becomes lower, the upper limit value becomes lower.

20 Claims, 10 Drawing Sheets

ROAD SURFACE FRICTIONAL COEFFICIENT
μi INFORMATION AT t = To

A CASE WHERE THE VEHICLE IS FOLLOWING A PRECEDING VEHICLE

A CASE WHERE THE VEHICLE IS RUNNING SOLELY

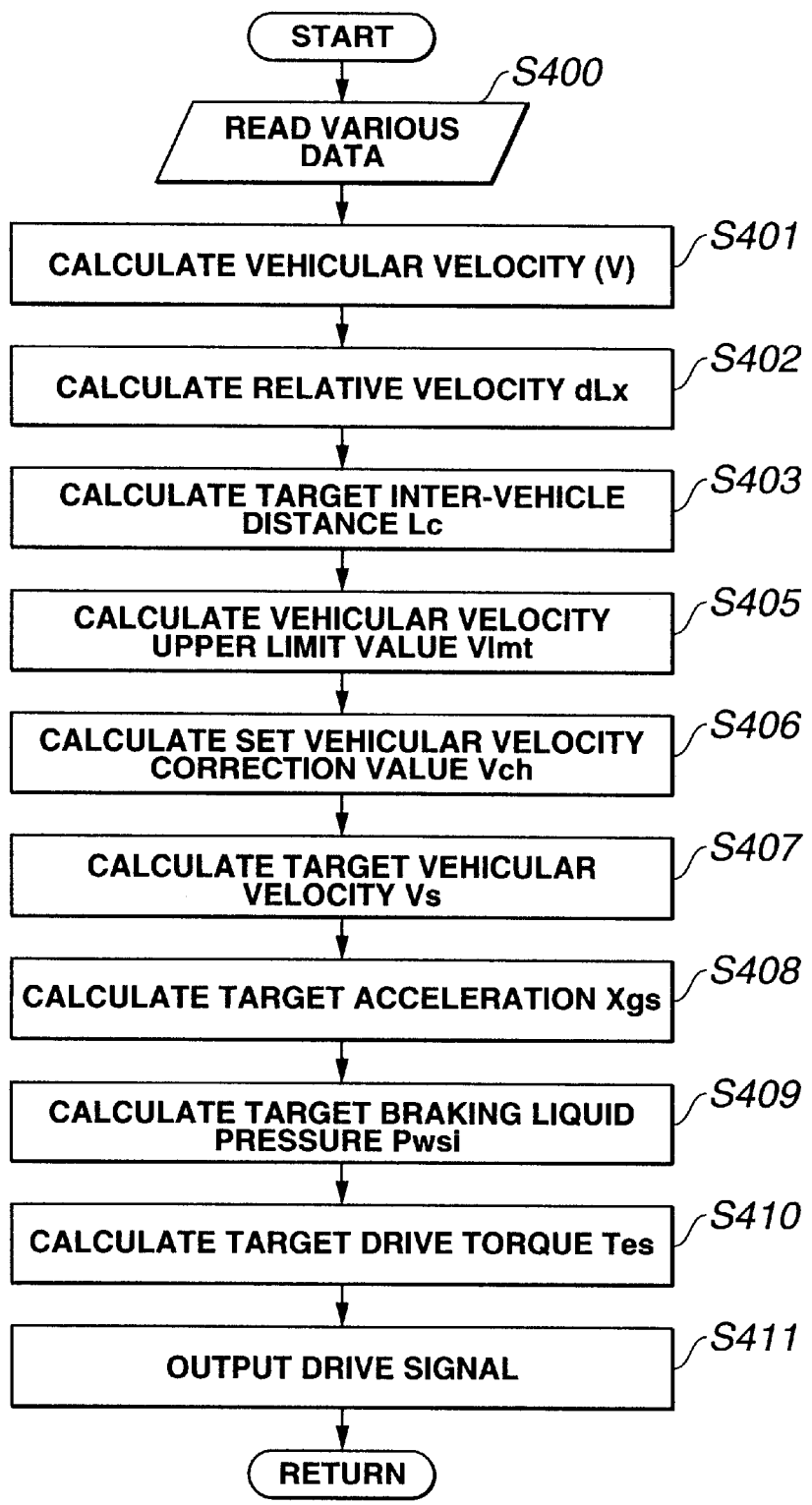

AUTOMATIC VEHICULAR VELOCITY CONTROLLING SYSTEM AND METHOD FOR AUTOMOTIVE VEHICLE

BACKGROUND OF THE INVENTION

1. Field of the Invention

The present invention relates generally to a technical field of vehicular velocity controlling system and method for an automotive vehicle (host vehicle) to control a vehicular velocity of the host vehicle to become substantially equal to a set vehicular velocity set by a vehicular driver.

2. Description of the Related Art

Various types of vehicular velocity controlling systems have been proposed, in which the vehicular velocity is merely controlled so that the vehicular velocity is made substantially equal to a set vehicular velocity that the vehicle driver has set and in which the vehicle is running in accordance with the set vehicular velocity in an event where a preceding vehicle which is running ahead of the vehicle is not present and the inter-vehicle distance is detected and the vehicular velocity of the host vehicle is controlled in a predetermined vehicular velocity range lower than the driver's set vehicular velocity (hereinafter, also called a set vehicular velocity) in accordance with a detected inter-vehicle distance and/or relative velocity to the preceding vehicle where the preceding vehicle is present.

A Japanese Patent Application First Publication No. Heisei 9-286257 published on Nov. 4, 1997 exemplifies a previously proposed inter-vehicle distance controlling system in which with the vehicular velocity controlling system of a preceding vehicle follow-up type as a prerequisite, the vehicular velocity when the preceding vehicle was placed at the position of the host vehicle is referred to and the vehicular velocity is implemented with the vehicular velocity as an upper limit value thereof.

In the previously proposed inter-vehicle distance controlling system disclosed in the above-described Japanese Patent Application First Publication, a road surface frictional coefficient is detected.

If the road surface frictional coefficient is small, namely, if the vehicle is running on a low frictional coefficient ($\mu$) road surface, the referenced vehicular velocity is applied as an upper limit value.

As described above, the vehicular velocity of the preceding vehicle by which the host vehicle is followed is set to the upper limit value of the vehicular velocity when the vehicle has arrived at the position. If a vehicle driver of the preceding vehicle has decelerated the preceding vehicle due to some reason, the host vehicle is also decelerated according to the deceleration of the preceding vehicle.

It becomes possible to reduce the vehicular velocity in response to some phenomenon that would be recognizable from the host vehicle so that a running stability would be improved.

SUMMARY OF THE INVENTION

However, in such previously proposed vehicular velocity controlling systems as described above in which the vehicular velocity is merely controlled to become substantially equal to the set vehicular velocity, the vehicular velocity is controlled in accordance with the set vehicular velocity of a vehicular driver irrespective of a vehicular running state. In addition, in the other previously proposed vehicular velocity controlling systems in which the vehicular velocity is controlled in accordance with the set vehicular velocity of a vehicular driver irrespective of a vehicular running state.

In addition, in the other previously proposed vehicular velocity controlling system in which the vehicular velocity is controlled with the inter-vehicle distance and relative velocity of the host vehicle to the preceding vehicle taken into consideration, the vehicular velocity is controlled in accordance with the set vehicular velocity by the vehicular driver in the same way as described in the former case when the distance to the preceding vehicle is sufficient and when the preceding vehicle is running at a sufficiently high velocity so that the vehicular velocity is controlled at a velocity value which accords with the set vehicular velocity by the driver and irrespective of a running state except the preceding vehicle.

Therefore, even if, for example, the vehicle is running on a low road surface having a low frictional coefficient, it is possible to set an arbitrarily high set vehicular velocity. In addition, in a case where the control such that the vehicular velocity of the preceding vehicle by which the host vehicle is followed is set to the upper limit value of the vehicular velocity of the host vehicle is carried out, such a situation that the preceding vehicle is present, a vehicle driver takes an attention to a state of the road surface and operates for the preceding vehicle to be decelerated to cope with the low frictional coefficient of the road surface.

In this case, there is a possibility of improving the running stability since the vehicle is also decelerated. However, if the vehicle driver of the preceding vehicle does not take the attention to the low frictional coefficient of the road surface on which the preceding vehicle is running and the vehicle driver of the preceding vehicle does not decelerate the preceding vehicle, the host vehicle would not be decelerated.

That is to say, there is a task to be solved such that the vehicular velocity of the host vehicle is controlled dependently on the preceding vehicle.

It is, hence, an object of the present invention to provide vehicular velocity controlling system and method for an automotive vehicle in which the host vehicle is running with its vehicular velocity suppressed to be lowered irrespective of the vehicular velocity of the preceding vehicle when the vehicle is running on the low frictional coefficient road surface, an improvement of the vehicular running stability independently of the preceding vehicle is made, and a sense of security of the host vehicle driver can be achieved.

The above-described object can be achieved by providing a vehicular velocity controlling system comprising: a vehicular velocity detector to detect a vehicular velocity; an inter-vehicle distance detector to detect an inter-vehicle distance from a vehicle to a preceding vehicle which is running ahead of the vehicle; a manual vehicular velocity setting section enabled to manually set a set vehicular velocity; a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle; a road surface frictional coefficient detector to detect a road surface frictional coefficient of a road surface; and an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower.

The above-described object can also be achieved by providing a vehicular velocity controlling system comprising: a vehicular velocity detector to detect a vehicular velocity; a manual vehicular velocity setting section enabled to manually set a set vehicular velocity; a vehicular velocity controller to perform a vehicular velocity control in such a manner that the vehicular velocity is substantially made equal to the set vehicular velocity by the manual vehicular velocity setting section; a road surface frictional coefficient detector to detect a road surface frictional coefficient of a road surface; and an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower.

The above-described object can also be achieved by providing a vehicular velocity controlling method comprising: detecting a vehicular velocity; detecting an inter-vehicle distance from a vehicle to a preceding vehicle which is running ahead of the vehicle; manually set a set vehicular velocity; performing a vehicular velocity control in such a manner that the inter-vehicle distance is substantially made equal to a target inter-vehicle distance set on the basis of at least the vehicular velocity during a presence of the preceding vehicle; performing the vehicular velocity control in such a manner that the vehicular velocity is substantially made equal to the set vehicular velocity an absence of the preceding vehicle; detecting a road surface frictional coefficient of a road surface; and setting an upper limit value of the vehicular velocity for the vehicular velocity control in accordance with the detected road surface frictional coefficient, below the upper limit value of which the vehicular velocity control is enabled to be performed, in such a manner that as the road surface frictional coefficient becomes lower, the upper limit value becomes lower.

The above-described object can also be achieved by providing a vehicular velocity controlling method comprising: detecting a vehicular velocity; manually setting a set vehicular velocity; performing a vehicular velocity control in such a manner that the vehicular velocity is substantially made equal to the set vehicular velocity; detecting a road surface frictional coefficient of a road surface; and setting an upper limit value of the vehicular velocity in accordance with the detected road surface frictional coefficient, below the upper limit value of which the vehicular velocity control is enabled to be performed, in such a manner that as the road surface frictional coefficient becomes lower, the upper limit value of the vehicular velocity control becomes lower.

The above-described object can also be achieved by providing a vehicular velocity controlling system comprising: vehicular velocity detecting means for detecting a vehicular velocity; inter-vehicle distance detecting means for detecting an inter-vehicle distance from a vehicle to a preceding vehicle which is running ahead of the vehicle; manual vehicular velocity setting means for manually setting a set vehicular velocity; vehicular velocity controlling means for performing a vehicular velocity control in such a manner that the inter-vehicle distance is substantially made equal to a target inter-vehicle distance set on the basis of at least the vehicular velocity during a presence of the preceding vehicle detected by the inter-vehicle distance detecting means and in such a manner that the vehicular velocity is substantially made equal to the set vehicular velocity through the manual vehicular velocity setting means during an absence of the preceding vehicle; road surface frictional coefficient detecting means for detecting a road surface frictional coefficient of a road surface; and upper limit vehicular velocity setting means for setting an upper limit value of the vehicular velocity for the vehicular velocity control in accordance with the detected road surface frictional coefficient, below the upper limit value of which the vehicular velocity controlling means is enabled to perform the vehicular velocity control, in such a manner that as the road surface frictional coefficient becomes lower, the upper limit value becomes lower.

BRIEF DESCRIPTION OF THE DRAWINGS

FIG. 11 is an operational flowchart of a control procedure executed in the drive force controller in a case of the fourth preferred embodiment according to the present invention.

DETAILED DESCRIPTION OF THE PREFERRED EMBODIMENT

Reference will hereinafter be made to the drawings in order to facilitate a better understanding of the present invention.

Figure 1:
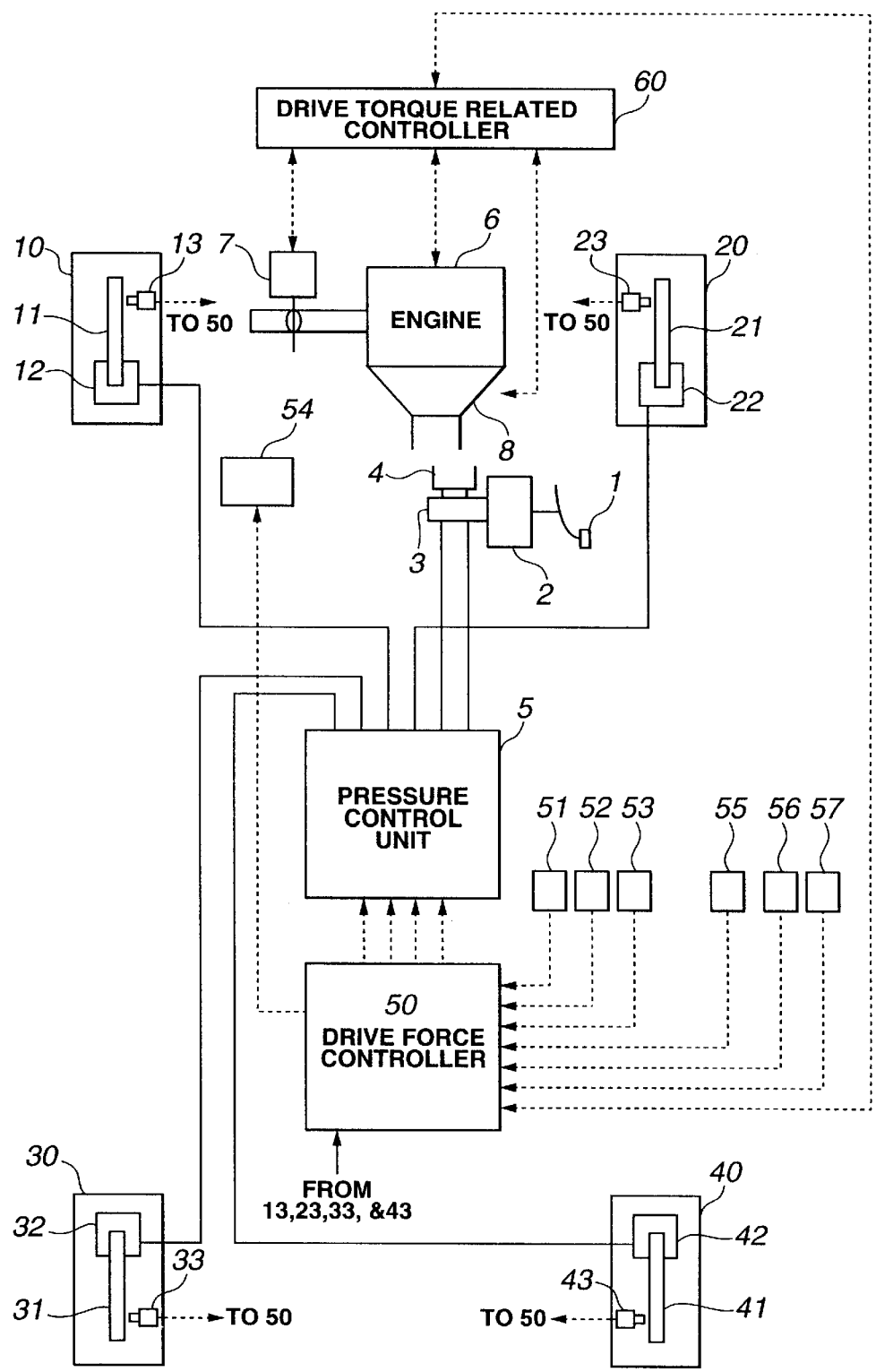
FIG. 1 is a whole system configuration view of a rear-wheel drive vehicle to which a vehicular velocity controlling system for an automotive vehicle in a first preferred embodiment according to the present invention is applicable.

FIG. 1 shows a system configuration of a preferred embodiment according to the present invention of a vehicular velocity controlling system applicable to a rear wheel drive vehicle (in which an automatic transmission and a well-known differential gear are mounted).

In FIG. 1, a brake pedal 1, a booster 2, a master cylinder 3, and a reservoir 4 are disposed in a brake system. Left and right front road wheels 10 and 20 and left and right rear road wheels 30 and 40 are disposed in the vehicle. Each of the four road wheels 10, 20, 30, and 40 is provided with a brake disc 11, 21, 31, and 41 a wheel cylinder 12, 22, 32, and 42 for frictionally grasping the corresponding brake disc 11, 21, 31, and 41 to give a braking force for each road wheel by a supply of a liquid pressure. When the liquid pressure is supplied to each wheel cylinder 12, 22, 32, and 42 of the brake system from a pressure control unit 5, each brake force for each corresponding road wheel 10, 20, 30, and 40 is individually and independently controlled. Pressure control unit 5 is constituted by an actuator included in an individual liquid pressure supply system (each channel) at front and rear left and right road wheels 10, 20, 30, and 40. A proportional solenoid valve is used to enable a control over a brake liquid pressure in each wheel cylinder to an arbitrary braking liquid pressure as the actuator.

Pressure control unit 5 adjusts a hydraulic pressure from master cylinder 3 in response to an input signal from the drive force controller 50 and controls the braking liquid pressure supplied to the wheel cylinders 12, 22, 32, and 42 of respective road wheels 10, 20, 30, and 40. In addition, drive force controller 50 performs an engine control such as to control a fuel injection quantity of an engine 6, a throttle valve opening angle control such as to control an opening angle of an engine throttle valve through a throttle controller 7, and performs an automatic transmission control such as to control a gear ratio of an automatic transmission 8 so as to perform a drive torque control via a drive torque related controller 60 which controls a drive torque of driven wheels 30 and 40.

Drive force controller 50 receives signals from an accelerator sensor 52 detecting a vehicular longitudinal acceleration Xg and a vehicular lateral acceleration Yg, signals from wheel velocity sensors 13, 23, 33, and 43 installed on the respectively corresponding road wheels 10, 20, 30, and 40 to detect respectively corresponding road wheel velocities Vwi, and a signal indicating a set position of a switch 53 to set a set vehicular velocity Vc manually by a vehicle driver of the host vehicle. Drive force controller 50 receives signals from a master cylinder liquid pressure sensor 55 to detect a master cylinder liquid pressure Pm in order to detect a manipulated variable of brake pedal 1, a signal from an accelerator opening angle sensor 56 to detect an opening angle Acc of accelerator in order to detect a manipulated variable of an accelerator pedal, and a signal indicating a drive torque Tw on a wheel axle from a drive torque related controller 60.

Figure 4:
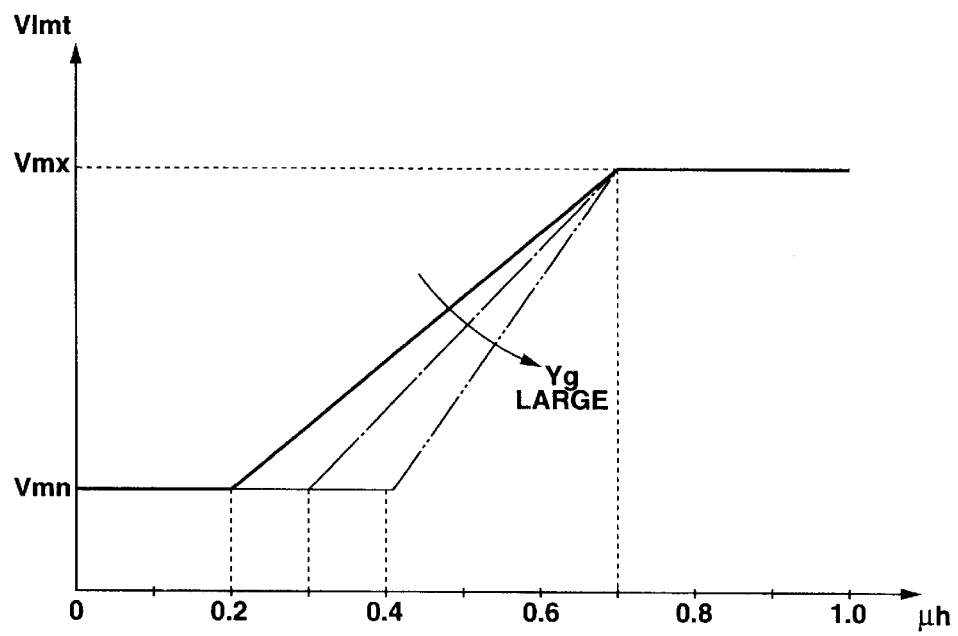
FIG. 4 is a characteristic graph representing a vehicular velocity upper limit value with respect to a road surface frictional coefficient correction value $\mu h$ and a lateral acceleration Yg in the first preferred embodiment according to the present invention.

A road surface frictional coefficient $\mu$ is received from a receiver 57. Thereafter, this value of road surface frictional coefficient $\mu$ is inputted into drive force controller 50. It is noted that road surface frictional coefficient $\mu$ transmitted from the infrastructure is a data in a unit of 0.1 and ranges from 0.1 to 1.0. In addition, as shown in FIG. 4, a reference position Xb (from a lane marker such as to enable obtaining of a positional information) is simultaneously obtained with the present position Xcar of the vehicle as an estimation enabled information.

Furthermore, a set vehicular velocity correction value Vch to which the vehicular velocity is controlled to be reached (although, in a normal case, the set vehicular velocity correction value Vch is the set vehicular velocity Vc to which the vehicle driver manually sets, in a case where the correction value is varied according to the road surface frictional coefficient, it becomes a value after the modification) and a target inter-vehicle distance Lc are displayed through a display monitor 54. In the display monitor 54, a buzzer to recognize it to the driver is installed. If the set vehicular velocity correction value Vch is modified, the buzzer is activated to inform the driver of it.

Next, an operation of the vehicular velocity controlling system shown in FIG. 1 will be described below.

[Vehicular Velocity Controlling Procedure]

Figure 3:
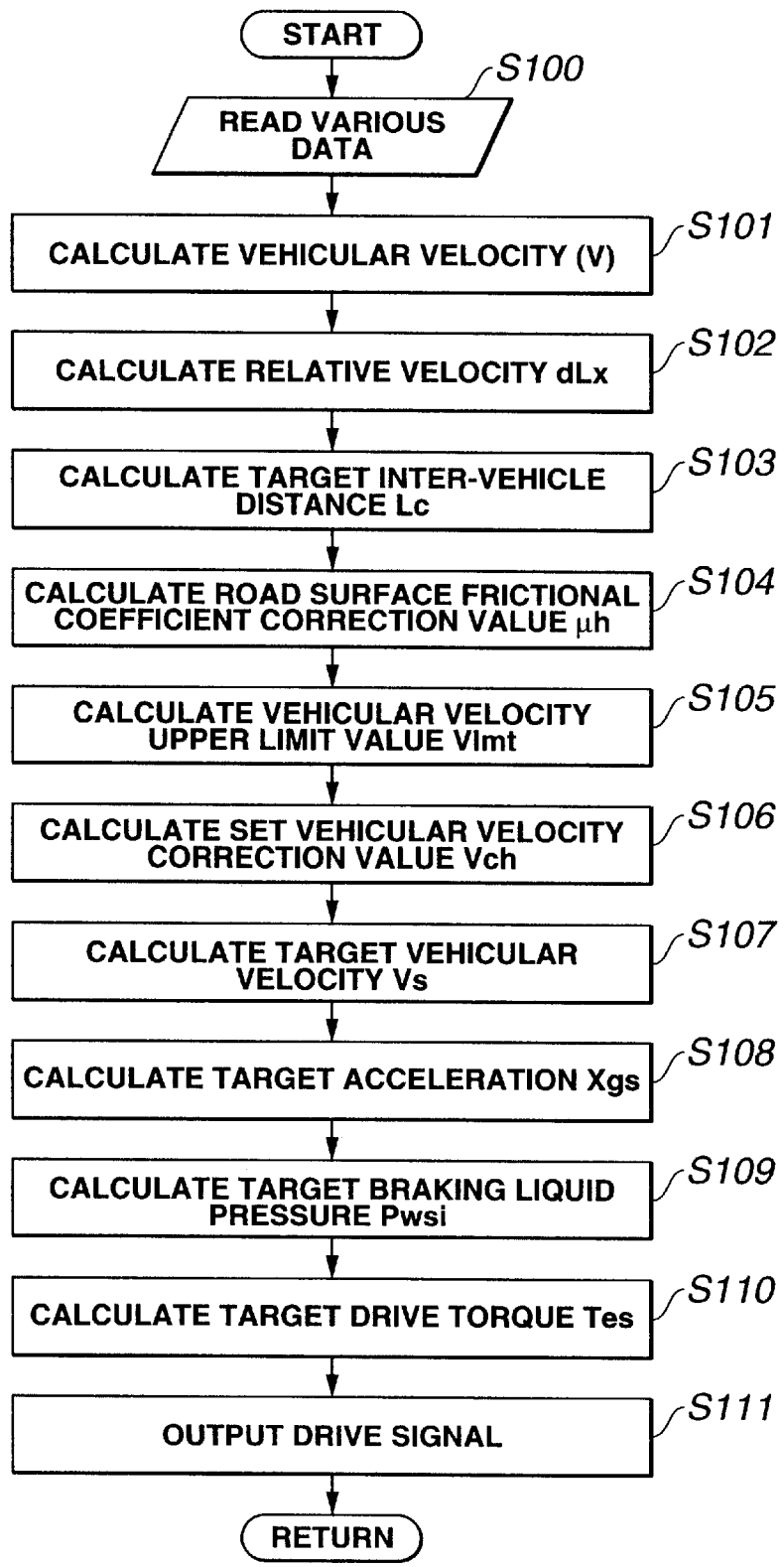
FIG. 3 is an operational flowchart of a control procedure executed by a drive force controller in the first preferred embodiment shown in FIG. 1.

FIG. 3 shows a flowchart representing a control procedure executed by drive force controller 50. It is noted that the term drive force used in the specification includes the brake force as well as the drive force.

This procedure shown in FIG. 3 is executed as a regular time interrupt routine whenever a predetermined time duration has passed by monitoring a time duration through an operating system of drive force related controller 50. It is noted that drive force controller 50 generally includes a microcomputer having a CPU (Central Processing Unit), a ROM (Read Only Memory), a RAM (Random Access Memory), an Input Port, an Output Port, an Interrupt Routine controller, a DMA (Direct Memory Access) controller, and a common bus.

At a step S100, drive force controller 50 reads various data from respective sensors 13, 23, 33, 43, 51, 52, 53, 55, 56, and 57 and drive torque controller 60.

In details, controller 50 stores into a memory such as RAM respective road wheel velocities Vwi(i=1 through 4) from road wheel velocity sensors 13, 23, 33, and 43, vehicular longitudinal acceleration Xg and lateral acceleration Yg from acceleration sensor 52 (corresponds to a vehicular running state detector), an accelerator opening angle Acc from accelerator opening angle sensor 56, master cylinder liquid pressure Pm from master cylinder liquid pressure sensor 55, the set vehicular velocity from switch 53, and the road surface frictional coefficient $\mu i$, the position Xmi, and reference position Xb from inter-road-to-vehicle communicating receiver 57. It is noted that i denotes a plural number and the road surface frictional coefficient $\mu i$ is stored into the memory as a function of position Xm: That is to say, $$\mu i = f(Xmi) \qquad (1).$$

In addition, drive force controller 50 reads drive torque Tw and inter-vehicle distance Lx to the preceding vehicle from drive torque related controller 60 and millimeter wave controller 51, respectively.

At a step S101, drive force controller 50 calculates a vehicular velocity V of the vehicle. In this embodiment, drive force controller 50 calculates a vehicular velocity V from an average value of the front road wheel velocities in accordance with road wheel velocities Vwi during a normal run.

That is to say, $$V=(Vw1+Vw2)/2 \quad (2).$$

In addition, in a case where an ABS (Anti-Lock Brake System) control is being activated, drive force controller 50 may calculate the vehicular velocity from a pseudo vehicular velocity estimated in ABS controller.

At a step S102, drive force controller 50 estimates the relative velocity dLx to the preceding vehicle. In the embodiment, drive force controller 50 calculates the relative velocity dLx in accordance with the following equation (3) according to the inter-vehicle distance Lx to the preceding vehicle.

That is to say, $$dLx=k1\cdot(Lx(n)-Lx(n-1))/\Delta T \quad (3).$$

In the equation (3), $\Delta T$ denotes a calculation period, k1 denotes a conversion constant, and n denotes a calculation timing.

At a step S103, drive force controller 50 calculates a target inter-vehicle distance Lc to the preceding vehicle. In this embodiment, target inter-vehicle distance Lc is calculated from vehicular velocity V in accordance with the following equation (4). That is to say, $$Lc=Kv1\cdot V+Kv2 \quad (4).$$

In the equation (4), Kv1 and kv2 denote control constants.

In this embodiment, drive force controller 50 calculates target inter-vehicle distance Lc merely in accordance with the vehicular velocity V. A manual setting of the inter-vehicle distance by the driver through a switch may be used to set the target inter-vehicle distance.

For example, if the driver sets the target inter-vehicle distance from three stages of long, middle, and short, control constants in the equation (4) may be modified and target inter-vehicle distance Lc may be modified.

At a step S104, drive force controller 50 calculates a road surface frictional coefficient correction value $\mu$h (corresponds to a road surface frictional coefficient detector).

Figure 2A:
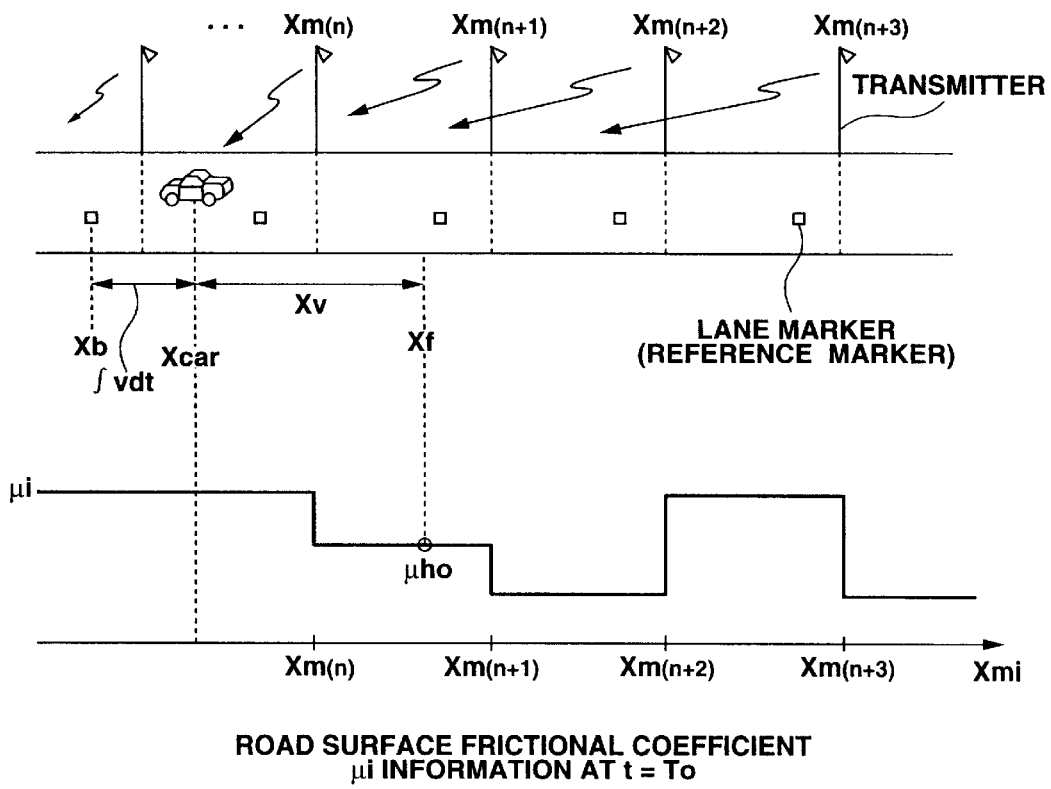
FIG. 2A is an explanatory view of a vehicular velocity positional information and a road surface frictional coefficient information retrieved from infrastructure via a communicating equipment and used in the first embodiment shown in FIG. 1.

In this embodiment, road surface frictional coefficient $\mu$h which is the road surface frictional coefficient to calculate vehicular velocity upper limit value Vlmt is calculated on the basis of $\mu i=f(Xmi)$ in equation (1) which is the function of the road surface frictional coefficient $\mu i$ and the position Xmi received via the inter-road-to-vehicle communications from the infrastructure (refer to FIG. 2A).

First, drive force controller 50 calculates the present position Xcar of the vehicle according to an integration of a latest reference position Xb and vehicular velocity V of the vehicle.

$$Xcar=Xb+\int Vdt \text{(integration from a time at which the vehicle has passed reference position to the present time)} \quad (5).$$

Next, the road surface frictional coefficient $\mu i$ to calculate the vehicular velocity upper limit value Xlmt is selected from the position Xmi corresponding to the vehicular position Xcar and the road surface frictional coefficient $\mu i$ to calculate the vehicular velocity upper limit value Xlmt is selected from the position Xmi corresponding to the vehicular position Xcar and a reference road surface friction coefficient $\mu i$ from the position Xmi corresponding to the host vehicle position $\mu i$:

$$\mu h0=f(Xf) \quad (6)$$

and $$Xf=Xcar+Xv \quad (7).$$

It is noted that Xv is a variable which varies with vehicular velocity V. As the vehicular velocity becomes higher, Vx becomes larger so that the vehicle can utilize the road surface frictional coefficient information in a more forward direction of the vehicle. It is also noted that since the road surface frictional coefficient $\mu i$ is varied in accordance with an interval of distance of each infrastructure, the road surface frictional coefficient is discontinuous with respect to the position Xcar of the host vehicle. Hence, a first-order filter is applied to the reference road surface frictional coefficient $\mu h0$.

Figure 5:
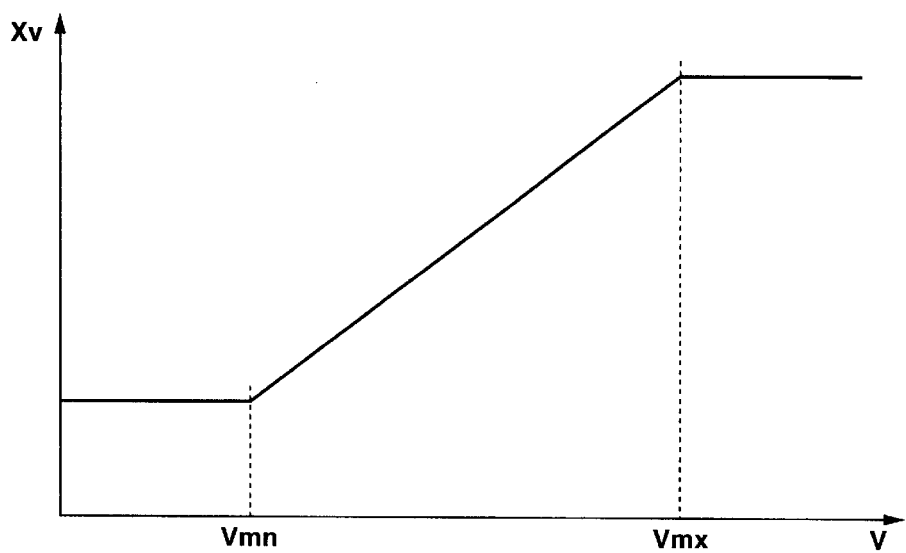
FIG. 5 is a characteristic graph representing a distance Xv in accordance with a vehicular velocity V from a vehicular position Xcar to a forward position at which a road surface frictional coefficient information is obtained.

At a subsequent step S105, drive force controller 50 calculates an upper limit value Vlmt of the vehicular velocity (which corresponds to an upper limit vehicular velocity setting section). In this embodiment, drive force controller 50 calculates the vehicular velocity upper limit value Vlmt in accordance with a characteristic graph shown in FIG. 5 according to the road surface frictional coefficient correction value $\mu$h and lateral acceleration Yg indicating a state of turn and calculates the vehicular velocity upper limit value Vlmt in accordance with the characteristic graph shown in FIG. 4. Vmx and Vmn shown in FIG. 4 denote maximum value and minimum value of an operation range enabling the operation of vehicular velocity control (Vmx=110 Km/h and Vmn=40 Km/h).

In addition, after any one of the above-described calculation is carried out, the set vehicular velocity correction value Vch is overwritten on the set vehicular velocity Vc (Vc=Vch). This means that since the set vehicular velocity Vc is not always modified by the driver and once the set vehicular velocity Vc is set, the set vehicular velocity Vc is set, the set vehicular velocity being held for a certain period of time. Such a set vehicular velocity indicating signal is a signal of such a type as described above, it means that the set vehicular velocity Vc itself is modified.

In addition, in a case where the set vehicular velocity correction value Vch at (2-1) is not the set vehicular velocity Vc set by the driver bit is modified by the vehicular velocity upper limit value Vlmt, if no modification on the switch operation by the driver is present. In addition, in a case where the set vehicular velocity correction value Vch is not the set vehicular velocity but is modified by the vehicular velocity upper limit value Vlmt, a vehicular velocity limitation control start flag $F_{ON}$ is turned to ON to recognize it to the vehicle driver. In the case other than (2-1), the vehicular velocity limitation control start flag $F_{ON}$ is turned to OFF. At the subsequent step S107, drive force controller 50 calculates a target vehicular velocity Vs from the set vehicular velocity correction value Vch, inter-vehicle distance Lx, target inter-vehicle distance Lc, and relative velocity dLx. In this embodiment, the target vehicular velocity Vs is calculated in the following equation (11).

$$Vs=Min(Vch, Vc+klp\cdot(Lx-Lc)+kld\cdot dLx) \quad (11).$$

In the equation (11), klp and kld denote control gains and Min (a, b) denotes a function to select one of a and b which is smaller than the other, and dLx denotes a minus relative velocity due to the approach of the preceding vehicle to the vehicle. In equation (11), in a case where lx is very large, i.e., when the distance of the vehicle to the preceding vehicle is extremely large and the preceding vehicle is not trapped, the set vehicular velocity correction value Vch is selected as target vehicular velocity Vs. It is noted that in a case where Lx is larger than a certain value, there is a method of carrying out the vehicular velocity control.

At a step S108, drive force controller 50 calculates a target acceleration Xgs. In this embodiment, target acceleration Xgs is calculated according to vehicular velocity V and target vehicular velocity Vs in accordance with the following equation (it is noted that the acceleration indicates positive and the deceleration indicates negative). That is to say, $$Xgs = kp \cdot \epsilon + ki \cdot \int \epsilon dt + Kd \cdot d\epsilon/dt \quad (12)$$

and $$\epsilon = Vs - V \quad (13).$$

It is noted that kp, ki, and kd denote control gains (proportional gain, integration gain, and differential gain). The contents of steps S105 and S106 correspond to a vehicular velocity controller.

At a step S109, drive force controller 50 calculates a target braking liquid pressure Pwsi. In this embodiment, target braking liquid pressure Pwsi is modified in accordance with the following equation according to target acceleration Xgs, master cylinder liquid pressure Pm, and the brake requirements.

That is to say, 1)

$$\text{if } Xgs < 0, Pwsi = Max(Kxi^*Xgs, Kb^*Pm) \quad (14)$$

and 2)

$$\text{if } Xgs \geq 0, Pwsi = Max(0, kb^*Pm) \quad (15).$$

In equations (14) and (15), kxi and kb denote coefficients (pad $\mu$ of each road wheel, wheel cylinder area, an effective radius of a rotor, and a tire effective radius), and Max denotes a function to select one of a and b which is larger than the other.

At a step S110, drive force controller 50 calculates a target drive force torque Tes in accordance with the following equations (16 and 17) according to drive train specifications. That is to say, if 1)

$$Xgs < 0, Tgs = Max(0, ka^*Acc) \quad (16)$$

and $$\text{if 2) } Xgs \geq 0, Tes = Max[kt^*Xgs, Ka^*Acc] \quad (17).$$

It is noted that ka and kt denote variables determined according to drive system requirements (gear inertia, gear ratio, transmission efficiency, engine characteristic, and so forth). It is also noted that in this case no consideration of an engine brake is paid.

At the subsequent step S111, drive force controller 50 outputs drive signals to pressure control unit 5 and drive torque related controller 60 in accordance with target braking liquid pressure Pwsi and target drive torque Tes. The set vehicular velocity correction value Vch calculated at step S106 is displayed through monitor 54.

If vehicular velocity limitation control flag $F_{ON}$ is in an ON state, a buzzer sound is generated to recognize the vehicle driver that the set vehicular velocity has been modified.

[Vehicular Velocity Controlling Operation]

Figure 6:
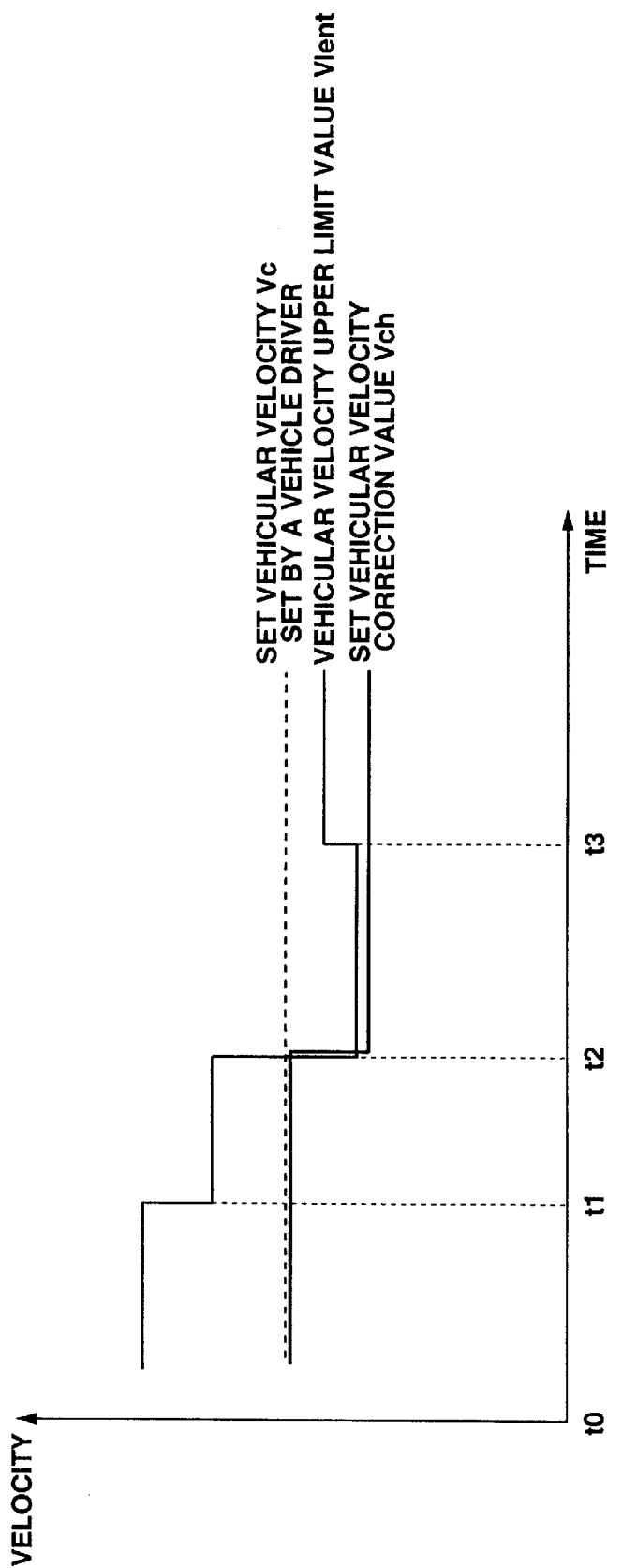
FIG. 6 is a characteristic graph representing a vehicular velocity to determine a set vehicular velocity correction value Vch in the first embodiment shown in FIG. 1.

First, when the vehicle is running on a road surface having a high frictional coefficient and subsequently a low frictional coefficient, on a basis of FIG. 6 representing a vehicular velocity relationship timing chart, the calculation of set vehicular velocity correction value Vch at step S116 will be described.

Then, when the time reaches from a time t1 to an immediately before a time t2, the vehicular velocity upper limit value Vlmt is reduced. However, since such a relationship that the vehicular velocity upper limit value Vlmt is larger than the set vehicular velocity Vc is maintained, the set vehicular velocity Vc is directly set as the set vehicular velocity correction value Vch. Then, up to a time t2, the vehicular velocity upper limit value Vlmt becomes lower than the set vehicular velocity Vc by the driver. Hence, up to an immediate before the time t3 from the time t2 at which the vehicular velocity upper limit value Vlmt becomes lower than the set vehicular velocity upper limit value Vlmt, the set vehicular velocity correction value Vch is the upper limit value Vlmt of the vehicular velocity since the upper limit value Vlmt of the vehicular velocity is at the decrement quantity side. When the time reaches to a time t3, the limit value Vlmt is increased. However, since such a relationship that the upper limit value Vlmt is smaller than the set vehicular velocity Vc is maintained, the previous set vehicular velocity correction value Vch is directly maintained without increment of the set vehicular velocity correction value.

Figure 7A:
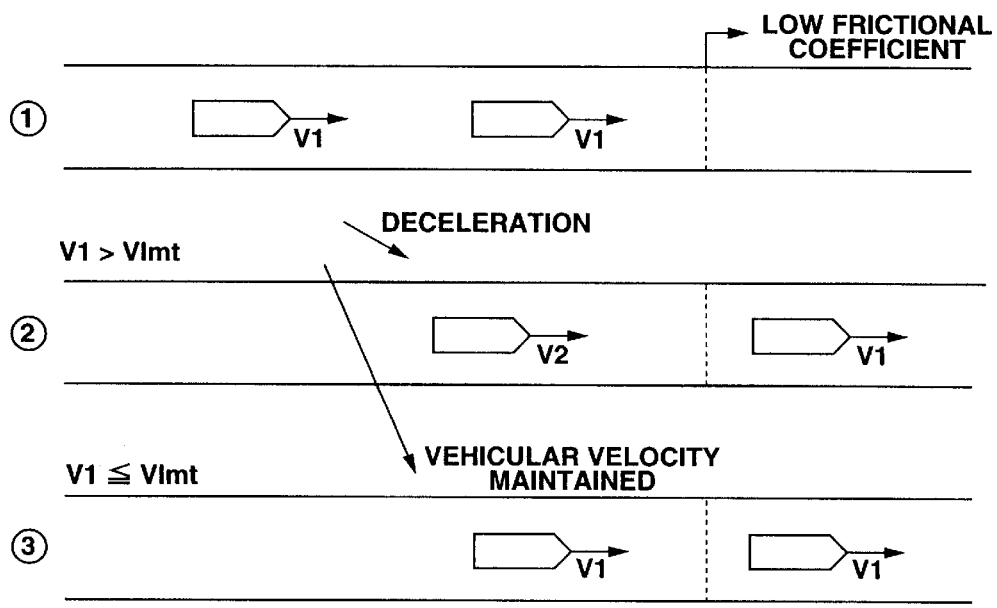
FIGS. 7A and 7B are explanatory views for explaining vehicular velocity control operations during a vehicular run to follow a preceding vehicle and during a vehicular run when no preceding vehicle is present, both in the first preferred embodiment shown in FIG. 1.

Next, FIG. 7A shows a vehicular velocity control when the vehicle is following the preceding vehicle and running from the road surface having the high frictional coefficient to that having the low frictional coefficient.

For example, a following control to follow the preceding vehicle on the high frictional coefficient road surface will be described below.

First, suppose that when the vehicle runs at a cruise speed at a set vehicular velocity $V_1$ as shown in ① of FIG. 7A, the preceding vehicle as shown in ② and ③ of FIG. 7A enters the low frictional coefficient road surface before the host vehicle. In this case, in a case where the vehicular velocity upper limit value Vlmt determined on the basis of the road surface frictional coefficient is smaller than the set vehicular velocity V1, the set vehicular velocity correction value Vch of the vehicle is the vehicular upper limit value Vlmt and is decelerated at vehicular velocity $V_2$ which is the vehicular velocity upper limit value Vlmt.

It is noted that, in this case, the vehicular velocity limit control flag $F_{ON}$ is turned to ON and a buzzer sound is developed to recognize that the set vehicular velocity correction value Vch of the vehicle is the vehicular velocity upper limit value Vlmt and is decelerated to the vehicular velocity $V_2$ which is the vehicular velocity upper limit value Vlmt. It is noted that, in this case, the vehicular velocity limitation control flag $F_{ON}$ is turned to ON and the buzzer sound is developed to inform the vehicular occupant that the set vehicular velocity is modified. In addition, in a case where the vehicular velocity upper limit value Vlmt determined on the basis of road surface frictional coefficient before the vehicle is equal to or lower than the set vehicular velocity $V_1$, the set vehicular velocity correction value Vch is the set vehicular velocity Vc so that the vehicular velocity $V_1$ is directly maintained.

Figure 7B:
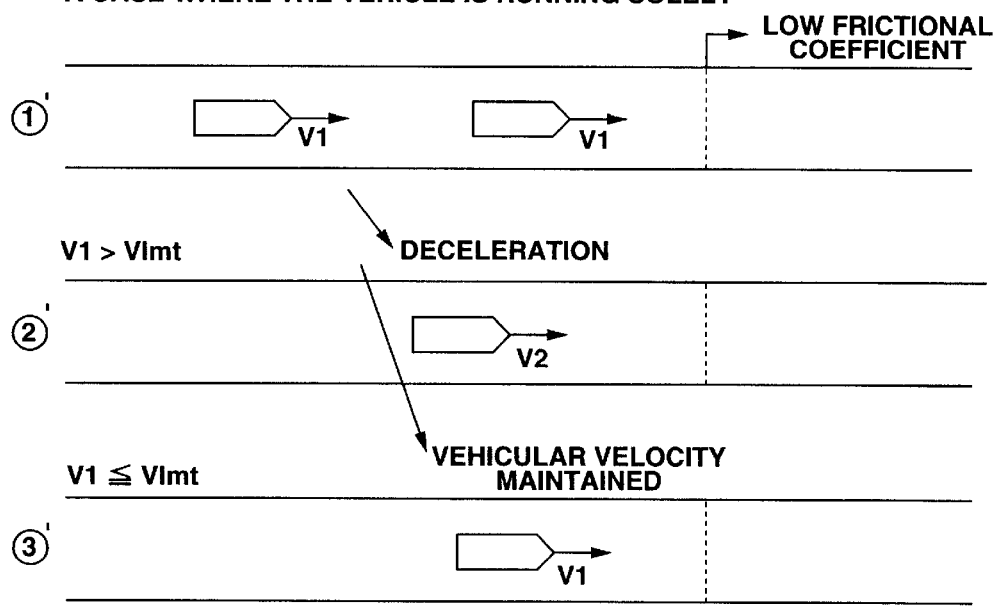

Next, suppose that the vehicular velocity control in a case where the vehicle enters the road surface having the low frictional coefficient from the high frictional coefficient to the low frictional coefficient during a sole run of the host vehicle without trap of the preceding vehicle as appreciated from FIG. 7B.

Suppose now that the vehicle is running at set vehicular velocity $V_1$ as shown in ①' of FIG. 7B and, thereafter, the vehicle is running solely on the road surface having the low frictional coefficient which is forward to the host vehicle as shown in ②' and ③' of FIG. 7B. If the vehicular velocity upper limit value Vlmt determined on the basis of the road surface frictional coefficient forward to the host vehicle as shown ③' of FIG. 7B, the set vehicular velocity correction value Vch of the vehicle is the set vehicular velocity Vc and the vehicular velocity V1 is directly maintained. That is to say, as shown in FIGS. 7A and 7B, the vehicular velocity control to decelerate the vehicle is carried out when the road surface frictional coefficient is low and the vehicular velocity upper limit value Vlmt is determined on the basis of the frictional coefficient which is forward to the host vehicle.

As described above, in a case where the vehicle is running on the road surface which is forward to the host vehicle and has the low frictional coefficient as shown in FIGS. 7A and 7B, for example, the vehicular velocity upper limit value Vlmt is modified in accordance with the road surface frictional coefficient. If the original set vehicular velocity Vc is large, the vehicular velocity is reduced before the road surface frictional coefficient has reached to the road surface so that a vehicular running stability can be secured. This is the same as a case where the preceding vehicle is present.

Even if the preceding vehicle maintains the high vehicular velocity irrespective of a variation in frictional coefficient of road surface, the host vehicle aims at securing the running stability to secure the stability without a dependence of the host vehicle on the preceding vehicle.

At the same time, since the vehicle is decelerated, the sense of security can be given to the vehicle driver. On the other hand, the above-described case is applied to the case where the preceding vehicle is present and even if the original set vehicular velocity Vc is sufficiently small with respect to the road surface functional coefficient, no influence on the vehicular velocity control in which the inter-vehicle distance holding function is provided is given and its performance can sufficiently be exhibited.

In the first preferred embodiment, the control equations described in the equations (11) through (17) are used in the vehicular velocity control portion based on the inter-vehicle distance to the preceding vehicle. A feed-forward control plus a feedback control may be used as described in Automotive Engineering Society Journal published on November, 1999 (pages 98 through 103, titled as "Development in Inter-vehicle Distance Automatic Control System" authored by Iizima et al).

(Second Embodiment)

In the first embodiment of the vehicular velocity controlling system, the vehicular velocity control with the inter-vehicle distance maintained (defined in claims 1 and 2) as prerequisite has been described in which the vehicular velocity upper limit value is modified in accordance with the road surface frictional coefficient. However, in a second embodiment of the vehicular velocity controlling system according to the present invention, a simple vehicular velocity control (defined in claim 3) is a prerequisite.

The same structure as the system in the first embodiment shown in FIG. 1 is applicable to the second embodiment and a system shown in FIG. 1 from which the inter-vehicle distance maintenance control relationship is eliminated may be adopted in the second embodiment.

Figure 8:
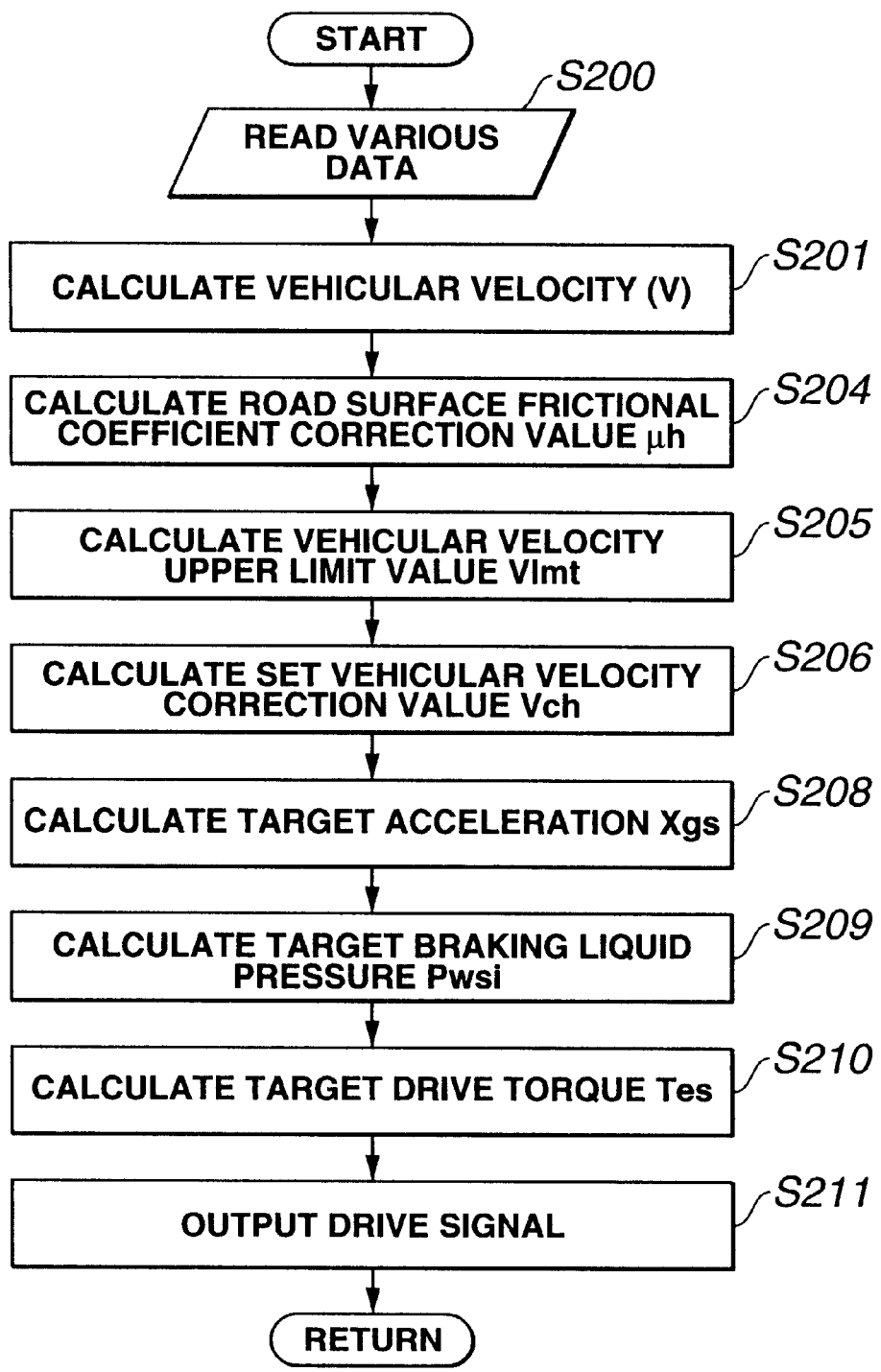
FIG. 8 is an operational flowchart of a control procedure executed in the drive force controller in a case of a second preferred embodiment of the vehicular velocity controlling system according to the present invention.

FIG. 8 is an example of a flowchart on a control program executed in the drive force controller 50 in the second embodiment according to the present invention. In this case, with respect to the flowchart shown in FIG. 3, steps S102, S103, and S107 are eliminated. In addition, as far as the other steps are concerned, the same contents are resulted except the steps described below.

The target vehicular velocity Vs derived at step S107 is the set vehicular velocity correction value Vch in itself in the case of the second embodiment.

Hence, the calculation equation at step 208 to calculate the target acceleration Xgs is derived as follows: That is to say, $$Xgs = Kp \cdot \epsilon + Ki \cdot \int \epsilon dt + Kd \cdot d\epsilon/dt \qquad (12)'$$

and $$\epsilon = Vch - V \qquad (13)',$$

wherein Kp, Ki, and Kd denote control gains.

As described above, with the simple vehicular velocity control as prerequisite, the vehicular velocity upper limit value Vlmt is modified in accordance with the road surface frictional coefficient in the same manner as the first embodiment as that the vehicular running stability is improved and the sense of security for the driver can be achieved (the same advantages as the cases ①' through ③' of FIG. 8B).

(Third Embodiment)

Although, in the first embodiment, the inter-road-to-vehicle communicating receiver 57 is adopted to detect the road surface frictional coefficient $\mu i$ and the position Xmi from the infrastructure installed aside the vehicle on which the vehicle is running as the road surface frictional coefficient detector, in a third embodiment, the road surface frictional coefficient is estimated from the vehicular running state of the host vehicle itself. The structure of the vehicular velocity controlling system in the third embodiment is the same as that in the first embodiment except the communication relationship with infrastructure shown in FIG. 1.

Figure 9:
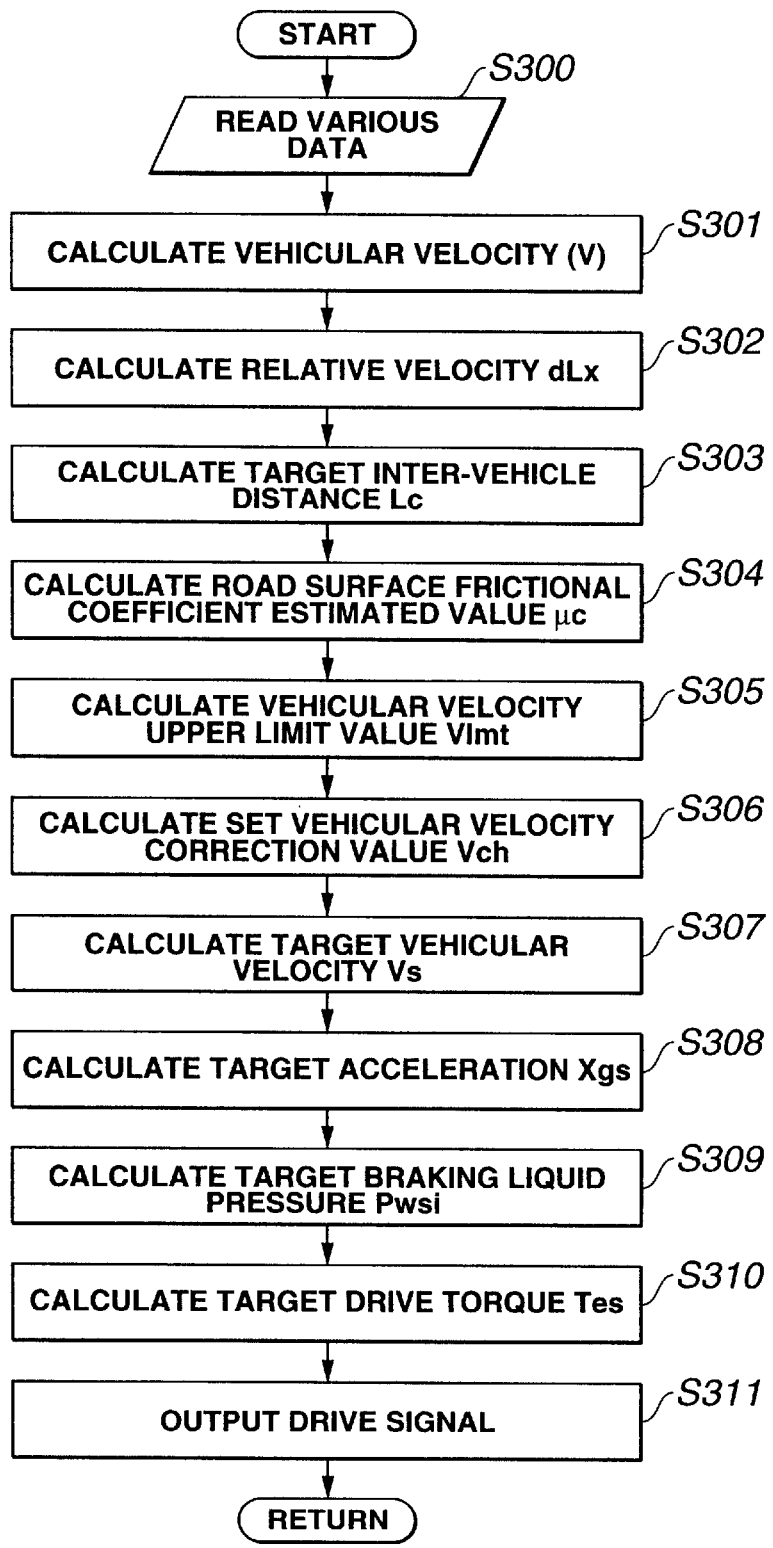
FIG. 9 is an operational flowchart of a control procedure executed in the drive force controller in a case of a third preferred embodiment of the vehicular velocity controlling system according to the present invention.

FIG. 9 shows an operational flowchart of a control program executed by a drive force controller 50 in the case of the third embodiment. In this case, the program flow shown in FIG. 9 is basically the same as except steps described below.

At a step S300, road surface frictional coefficient is not included from among read data in a step S100.

At a step S304, road surface frictional coefficient estimated value $\mu c$ is calculated in accordance with a vehicular running state. A method of calculating the road surface frictional coefficient estimated value $\mu c$ may include a method of deriving the road surface frictional coefficient $\mu c$ from the road wheel velocity, the vehicular body velocity, and the drive (or brake) torque of road wheels as disclosed in a Japanese Patent Application First Publication No. Heisei 11-334555 published on Dec. 7, 1999.

Figure 10:
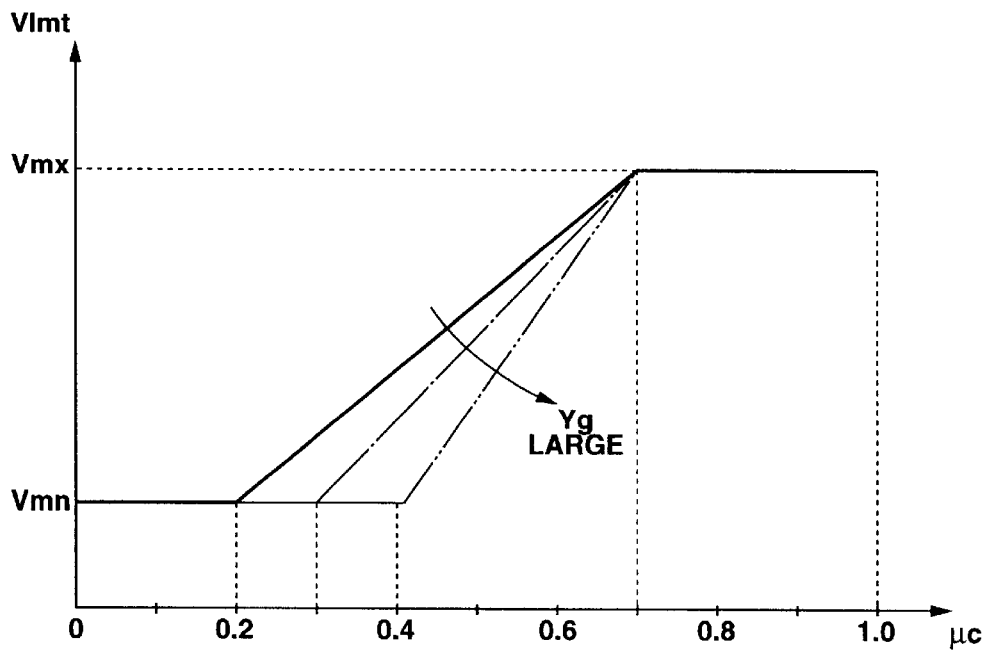
FIG. 10 is a characteristic graph representing a vehicular velocity upper limit value with respect to an estimated road surface frictional coefficient $\mu c$ and lateral acceleration Yg in the case of a third preferred embodiment of the vehicular velocity controlling system according to the present invention.

At the step S305, controller 50 calculates vehicular velocity upper limit value Vlmt. In the third embodiment, controller 50 calculates the vehicular velocity upper limit value Vlmt in accordance with a characteristic graph shown in FIG. 10 according to road surface frictional coefficient estimated value $\mu c$ calculated at step S304 and lateral acceleration Yg indicating a vehicular turn state. It is noted that Vmx and Vmn denote maximum value and minimum value in the region of operation enabling the operation of vehicular velocity control in the same manner as the first embodiment.

As far as the contents of steps S306 through S311 are concerned, these contents are the same as steps S106 through S111 in the first embodiment.

In the third embodiment of the vehicular velocity controlling system, as is different from the first embodiment, the road surface frictional coefficient of the road surface on which the vehicle has been run, i.e., the vehicular running state is used in stead of the road surface frictional coefficient of the road surface on which the vehicle is about to run, i.e., which is located in the vehicular forwarding direction. In the third embodiment, the vehicular velocity cannot, beforehand, be suppressed but, since an abrupt change in the road surface frictional coefficient does not often occur, an advantage as described above can be obtained when upon the change in the road surface frictional coefficient, the vehicular velocity upper limit value Vlmt is reduced and, thereafter, the vehicular velocity is reduced in a case where the road surface frictional coefficient becomes reduced.

(Fourth Embodiment)

Figure 2B:
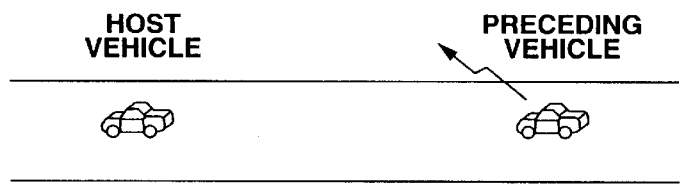
FIG. 2B is an explanatory view of the vehicular positional information and the road surface coefficient information retrieved from a preceding vehicle via a communicating equipment in a fourth preferred embodiment of the vehicular velocity controlling system.

In a fourth embodiment of the vehicular velocity controlling system according to the present invention, the road surface frictional coefficient is obtained via a communication from the preceding vehicle which is running ahead of the vehicle at the same traffic lane (defined in claim 5 and as shown in FIG. 2B).

In the fourth embodiment, the road surface frictional coefficient is retrieved from the preceding vehicle which is running ahead of the vehicle at the same traffic lane via a (wireless) communication.

In the fourth embodiment, transmitters and receivers which can communicate with the other vehicle are needed to be mounted in both of the host vehicle and preceding vehicle. In addition, the preceding vehicle is needed to estimate the road surface frictional coefficient as described in the third embodiment.

The same structure as the system in the first embodiment shown in FIG. 1 is adopted in the fourth embodiment except that a communication equipment with the preceding vehicle is mounted in the host vehicle in place of the communication relationship with the infrastructure.

FIG. 11 shows an operational flowchart executed by the drive force controller 50 in the case of the fourth embodiment. The procedure in the fourth embodiment is basically the same as that shown in FIG. 3 except the following steps.

That is to say, at step S400, the road surface frictional coefficient $\mu f(Lx)$ transmitted from the preceding vehicle is read from an inter-vehicle communicating receiver. It is noted that Lx denotes inter-vehicle distance and is detected from the external environment recognition sensor. In addition, a step corresponding to step S104 is omitted from the flowchart shown in FIG. 11.

Figure 12:
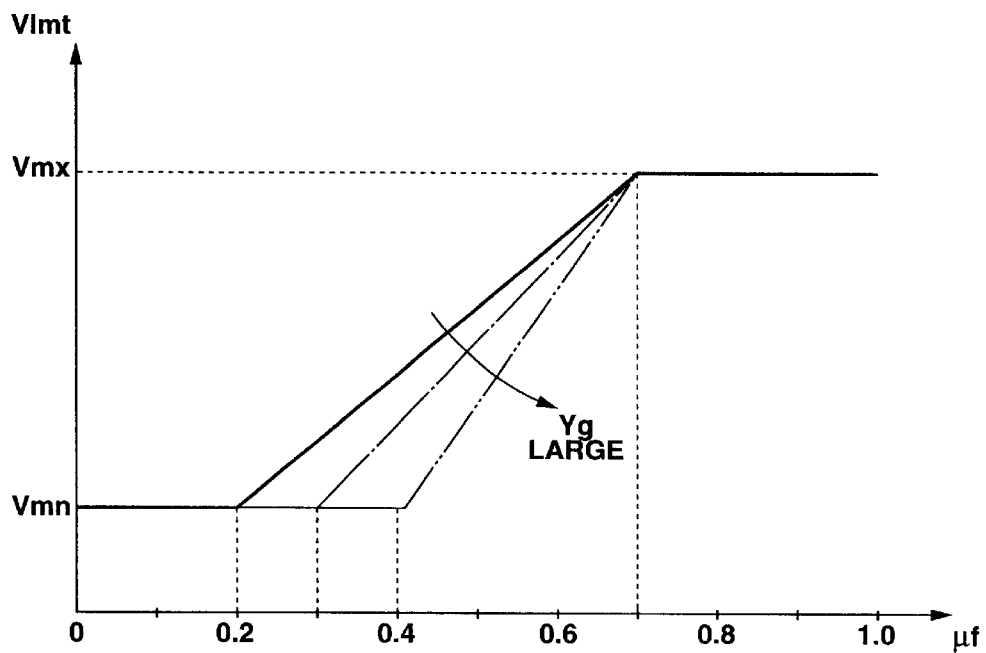
FIG. 12 is a characteristic graph representing a vehicular velocity upper limit value with respect to the road surface frictional coefficient $\mu f$ and lateral acceleration Yg in the case of the fourth preferred embodiment.

At the next step S405, drive force controller 50 calculates the vehicular velocity upper limit value Vlmt. In the fourth embodiment, drive force controller 50 calculates Vlmt in accordance with a characteristic graph shown in FIG. 12 according to road surface frictional coefficient $\mu f$ obtained via the communication at step S400 and lateral acceleration Yg representing a turn state. It is noted that Vmx and Vmn denote maximum value of the operation area enabled to operate vehicular velocity and minimum value thereof in the same manner as the first embodiment.

The contents of steps S406 through S411 are the same as those steps S106 through S111 in the first embodiment.

In the fourth embodiment, since the road surface frictional coefficient located in forward direction of the host vehicle is detected by the inter-vehicle communication from the preceding vehicle, the control is carried out before the actual road surface frictional coefficient is varied and it is more effective in terms of a vehicular safety.

However, since the preceding vehicle is not always present in the forward direction of the host vehicle, both of the road surface frictional coefficient calculated according to the vehicular running state as in the case of the third embodiment and that derived from the preceding vehicle via the inter-vehicle communications are needed to be considered. If the preceding vehicle is present, a more importance is placed on the road surface frictional coefficient of the preceding vehicle. If no preceding vehicle is present, a more importance is placed on the road surface frictional coefficient estimated from the vehicular running state.

Furthermore, the following priority order is taken when the road surface frictional coefficient and information from the infrastructure is adopted as in the first embodiment. That is to say, the priority order is (1) the information from the road surface, (2) an information from the preceding vehicle, and (3) an estimated information from the host vehicle itself. In this way, the road surface coefficient information is always retrieved when the vehicle is running.

It is noted that the drive force is positive and the brake force is negative so that the drive force controller is also called a drive (or brake) force controller and the acceleration is positive and a deceleration is negative so that the acceleration includes the deceleration when the acceleration value indicates minus.

The entire contents of a Japanese Patent Application No. 2000-202639 (filed in Japan on Jul. 4, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular velocity controlling system comprising:
   a vehicular velocity detector to detect a vehicular velocity;
   an inter-vehicle distance detector to detect an inter-vehicle distance from a vehicle to a preceding vehicle which is running ahead of the vehicle;
   a manual vehicular velocity setting section enabled to manually set a set vehicular velocity;
   a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle;
   a road surface frictional coefficient detector to detect a road surface frictional coefficient of a road surface; and
   an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower.

2. A vehicular velocity controlling system as claimed in claim 1, wherein the vehicular velocity controller performs the vehicular velocity control in such a manner that the inter-vehicle distance is substantially made equal to the set vehicular velocity at a vehicular velocity range lower than the set vehicular velocity through the manual vehicular velocity setting section.

3. A vehicular velocity controlling system as claimed in claim 1, further comprising a vehicular running state detector to detect a vehicular running state of the vehicle and wherein the road surface frictional coefficient detector comprises an estimator to estimate the road surface frictional coefficient from the vehicular running state detected by the vehicular running state detector.

4. A vehicular velocity controlling system as claimed in claim 1, further comprising a set vehicular velocity modification recognizing section that makes a vehicular occupant recognize through at least one of an alarm issuance and a monitor display that the set vehicular velocity has been modified when the upper limit value set through the upper limit vehicular velocity setting section is reduced and exceeded below the set vehicular velocity set through the manually set vehicular velocity setting section.

5. A vehicular velocity controlling system comprising:

a vehicular velocity detector to detect a vehicular velocity;

an inter-vehicle distance detector to detect an inter-vehicle distance from a vehicle to a preceding vehicle which is running ahead of the vehicle;

a manual vehicular velocity setting section enabled to manually set a set vehicular velocity;

a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle;

a road surface frictional coefficient detector to detect a road surface frictional coefficient of a road surface; and an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower;

wherein the road surface frictional coefficient detector comprises a road surface frictional coefficient detecting section that acquires a road surface frictional coefficient information from a road surface frictional coefficient measuring facility installed aside the road surface through a wireless communication and that detects the road surface frictional coefficient of the road surface placed in a vehicular forwarding direction.

6. A vehicular velocity controlling system comprising:

a vehicular velocity detector to detect a vehicular velocity;

an inter-vehicle distance detector to detect an inter-vehicle distance from a vehicle to a preceding vehicle which is running ahead of the vehicle;

a manual vehicular velocity setting section enabled to manually set a set vehicular velocity;

a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle;

a road surface frictional coefficient detector to detect a road surface frictional coefficient of a road surface; and an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower;

wherein the road surface frictional coefficient detector comprises a road surface frictional coefficient detecting section that acquires a road surface frictional coefficient information from the preceding vehicle through a wireless communication and that detects the road surface frictional coefficient of the road surface placed in a vehicular forwarding direction.

7. A vehicular velocity controlling system as claimed in claim 6, wherein the upper limit vehicular velocity setting section comprises a setting section that sets the upper limit value of the vehicular velocity which accords with the road surface frictional coefficient placed in the vehicular forwarding direction when the road surface frictional coefficient placed in the vehicular forwarding direction is varied to a smaller value and the vehicular velocity controller controls the vehicular velocity to the upper limit value of the vehicular velocity set by the vehicular velocity setting section until the vehicle reaches to a forwarding position at which the road surface frictional coefficient is detected.

8. A vehicular velocity controlling system comprising:

a vehicular velocity detector to detect a vehicular velocity;

an inter-vehicle distance detector to detect an inter-vehicle distance from a vehicle to a preceding vehicle which is running ahead of the vehicle;

a manual vehicular velocity setting section enabled to manually set a set vehicular velocity;

a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle;

a road surface frictional coefficient detector to detect a road surface frictional coefficient of a road surface; and an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower;

wherein the vehicular velocity controller comprises a first vehicular velocity controlling section that performs the vehicular velocity control to reduce the vehicular velocity in accordance with the upper limit value of the vehicular velocity when the upper limit value of the vehicular velocity set by the vehicular velocity upper limit value setting section is reduced and exceeds the set vehicular velocity set through the manual vehicular velocity setting section and the upper limit value of the vehicular velocity is varied in a decrease direction thereof and a second vehicular velocity controlling section that maintains the set vehicular velocity set through the manual vehicular velocity setting section prior to an increase in the upper limit value of the vehicular velocity if the upper limit value of the vehicular velocity is below the set vehicular velocity set through the manual vehicular velocity setting section and the upper limit value of the vehicular velocity is varied in an increase direction thereof.

9. A vehicular velocity controlling system comprising:

a vehicular velocity detector to detect a vehicular velocity;

an inter-vehicle distance detector to detect an inter-vehicle distance from a vehicle to a preceding vehicle which is running ahead of the vehicle;

a manual vehicular velocity setting section enabled to manually set a set vehicular velocity;

a vehicular velocity controller to perform a vehicular velocity control in such a manner that the inter-vehicle distance is substantially made equal to a target inter-vehicle distance set on the basis of at least the vehicular velocity during a presence of the preceding vehicle detected by the inter-vehicle distance detector and in such a manner that the vehicular velocity is substantially made equal to the set vehicular velocity through the manual vehicular velocity setting section during an absence of the preceding vehicle;

a road surface frictional coefficient detector to detect a road surface frictional coefficient of a road surface;

an upper limit vehicular velocity setting section that sets an upper limit value of the vehicular velocity for the vehicular velocity control in accordance with the detected road surface frictional coefficient, below the upper limit value of which the vehicular velocity controller is enabled to perform the vehicular velocity control, in such a manner that as the road surface frictional coefficient becomes lower, the upper limit value becomes lower; and a vehicular turn state detector to detect a vehicular turn state and wherein the upper limit vehicular velocity setting section comprises a setting section that makes a decrement quantity of the upper limit value of the vehicular velocity which accords with a decrease of the road surface functional coefficient larger than that at the vehicular running state except an abrupt turn when the vehicular turn state detector detects that the detected vehicular turn state indicates the abrupt turn.

10. A vehicular velocity controlling system comprising:

a vehicular velocity detector to detect a vehicular velocity;

a manual vehicular velocity setting section enabled to manually set a set vehicular velocity;

a vehicular velocity controller to perform a vehicular velocity control in such a manner that the vehicular velocity is substantially made equal to the set vehicular velocity by the manual vehicular velocity setting section;

a road surface frictional coefficient detector to detect a road surface frictional coefficient of a road surface; and an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower.

11. A vehicular velocity controlling system as claimed in claim 10, further comprising a vehicular running state detector to detect a vehicular running state of the vehicle and wherein the road surface frictional coefficient detector comprises an estimator to estimate the road surface frictional coefficient from the vehicular running state detected by the vehicular running state detector.

12. A vehicular velocity controlling system as claimed in claim 10, further comprising a set vehicular velocity modification recognizing section that makes a vehicular occupant recognize through at least one of an alarm issuance and a monitor display that the set vehicular velocity has been modified when the upper limit value set through the upper limit vehicular velocity setting section is reduced and exceeded below the set vehicular velocity set through the manually set vehicular velocity setting section.

13. A vehicular velocity controlling system as claimed in claim 10, further comprising a vehicular turn state detector to detect a vehicular turn state and wherein the upper limit vehicular velocity setting section comprises a setting section that makes a decrement quantity of the upper limit value of the vehicular velocity which accords with a decrease of the road surface functional coefficient larger than that at the vehicular running state except an abrupt turn when the vehicular turn state detector detects that the detected vehicular turn state indicates the abrupt turn.

14. A vehicular velocity controlling system comprising:

a vehicular velocity detector to detect a vehicular velocity;

a manual vehicular velocity setting section enabled to manually set a set vehicular velocity;

a vehicular velocity controller to perform a vehicular velocity control in such a manner that the vehicular velocity is substantially made equal to the set vehicular velocity by the manual vehicular velocity setting section;

a road surface frictional coefficient detector to detect a road surface frictional coefficient of a road surface; and an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower;

wherein the road surface frictional coefficient detector comprises a road surface frictional coefficient detecting section that acquires a road surface frictional coefficient information from a road surface frictional coefficient measuring facility installed aside the road surface through a wireless communication and that detects the road surface frictional coefficient of the road surface placed in a vehicular forwarding direction.

15. A vehicular velocity controlling system comprising:

a vehicular velocity detector to detect a vehicular velocity;

a manual vehicular velocity setting section enabled to manually set a set vehicular velocity;

a vehicular velocity controller to perform a vehicular velocity control in such a manner that the vehicular velocity is substantially made equal to the set vehicular velocity by the manual vehicular velocity setting section;

a road surface frictional coefficient detector to detect a road surface frictional coefficient of a road surface; and an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower;

wherein the road surface frictional coefficient detector comprises a road surface frictional coefficient detecting section that acquires a road surface frictional coefficient information from the preceding vehicle through a wireless communication and that detects the road surface frictional coefficient of the road surface placed in a vehicular forwarding direction.

16. A vehicular velocity controlling system comprising:

a vehicular velocity detector to detect a vehicular velocity;

a manual vehicular velocity setting section enabled to manually set a set vehicular velocity;

a vehicular velocity controller to perform a vehicular velocity control in such a manner that the vehicular velocity is substantially made equal to the set vehicular velocity by the manual vehicular velocity setting section;

a road surface frictional coefficient detector to detect a road surface frictional coefficient of a road surface; and an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower;

wherein the vehicular velocity controller comprises a first vehicular velocity controlling section that performs the vehicular velocity control to reduce the vehicular velocity in accordance with the upper limit value of the vehicular velocity when the upper limit value of the vehicular velocity set by the vehicular velocity upper limit value setting section is reduced and exceeds the set vehicular velocity set through the manual vehicular velocity setting section and the upper limit value of the vehicular velocity is varied in a decrease direction thereof and a second vehicular velocity controlling section that maintains the set vehicular velocity set through the manual vehicular velocity setting section prior to an increase in the upper limit value of the vehicular velocity if the upper limit value of the vehicular velocity is below the set vehicular velocity set through the manual vehicular velocity setting section and the upper limit value of the vehicular velocity is varied in an increase direction thereof.

17. A vehicular velocity controlling system comprising:

a vehicular velocity detector to detect a vehicular velocity;

a manual vehicular velocity setting section enabled to manually set a set vehicular velocity;

a vehicular velocity controller to perform a vehicular velocity control in such a manner that the vehicular velocity is substantially made equal to the set vehicular velocity by the manual vehicular velocity setting section;

a road surface frictional coefficient detector to detect a road surface frictional coefficient of a road surface;

an upper limit vehicular velocity setting section that sets an upper limit value of the vehicular velocity in accordance with the detected road surface frictional coefficient, below the upper limit value of which the vehicular velocity controller is enabled to perform the vehicular velocity control, in such a manner that as the road surface frictional coefficient becomes lower, the upper limit value of the vehicular velocity control becomes lower; and a set vehicular velocity modification recognizing section that makes a vehicular occupant recognize through at least one of an alarm issuance and a monitor display that the set vehicular velocity has been modified when the upper limit value set through the upper limit vehicular velocity setting section is reduced and exceeded below the set vehicular velocity set through the manually set vehicular velocity setting section;

wherein the upper limit vehicular velocity setting section comprises a setting section that sets the upper limit value of the vehicular velocity which accords with the road surface frictional coefficient placed in the vehicular forwarding direction when the road surface frictional coefficient placed in the vehicular forwarding direction is varied to a smaller value and the vehicular velocity controller controls the vehicular velocity to the upper limit value of the vehicular velocity set by the vehicular velocity setting section until the vehicle reaches to a forwarding position at which the road surface frictional coefficient is detected.

18. A vehicular velocity controlling method comprising:

detecting a vehicular velocity;

detecting an inter-vehicle distance from a vehicle to a preceding vehicle which is running ahead of the vehicle;

manually set a set vehicular velocity;

performing a vehicular velocity control in such a manner that the inter-vehicle distance is substantially made equal to a target inter-vehicle distance set on the basis of at least the vehicular velocity during a presence of the preceding vehicle;

performing the vehicular velocity control in such a manner that the vehicular velocity is substantially made equal to the set vehicular velocity an absence of the preceding vehicle;

detecting a road surface frictional coefficient of a road surface; and setting an upper limit value of the vehicular velocity for the vehicular velocity control in accordance with the detected road surface frictional coefficient, below the upper limit value of which the vehicular velocity control is enabled to be performed, in such a manner that as the road surface frictional coefficient becomes lower, the upper limit value becomes lower.

19. A vehicular velocity controlling method comprising:

detecting a vehicular velocity;

manually setting a set vehicular velocity;

performing a vehicular velocity control in such a manner that the vehicular velocity is substantially made equal to the set vehicular velocity;

detecting a road surface frictional coefficient of a road surface; and setting an upper limit value of the vehicular velocity in accordance with the detected road surface frictional coefficient, below the upper limit value of which the vehicular velocity control is enabled to be performed, in such a manner that as the road surface frictional coefficient becomes lower, the upper limit value of the vehicular velocity control becomes lower.

20. A vehicular velocity controlling system comprising:

vehicular velocity detecting means for detecting a vehicular velocity;

inter-vehicle distance detecting means for detecting an inter-vehicle distance from a vehicle to a preceding vehicle which is running ahead of the vehicle;

manual vehicular velocity setting means for manually setting a set vehicular velocity;

vehicular velocity controlling means for performing a vehicular velocity control in such a manner that the inter-vehicle distance is substantially made equal to a target inter-vehicle distance set on the basis of at least the vehicular velocity during a presence of the preceding vehicle detected by the inter-vehicle distance detecting means and in such a manner that the vehicular velocity is substantially made equal to the set vehicular velocity through the manual vehicular velocity setting means during an absence of the preceding vehicle;

road surface frictional coefficient detecting means for detecting a road surface frictional coefficient of a road surface; and upper limit vehicular velocity setting means for setting an upper limit value of the vehicular velocity for the vehicular velocity control in accordance with the detected road surface frictional coefficient, below the upper limit value of which the vehicular velocity controlling means is enabled to perform the vehicular velocity control, in such a manner that as the road surface frictional coefficient becomes lower, the upper limit value becomes lower.

* * * * *

UNITED STATES PATENT AND TRADEMARK OFFICE
CERTIFICATE OF CORRECTION

PATENT NO. : 6,618,664 B2
DATED : September 9, 2003
INVENTOR(S) : Shinji Matsumoto et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 95 days. --

Signed and Sealed this

Thirty-first Day of August, 2004

JON W. DUDAS
*Director of the United States Patent and Trademark Office*